(12) United States Patent
Bouissiere

(10) Patent No.: US 7,758,001 B2
(45) Date of Patent: Jul. 20, 2010

(54) MOUNT WITH MAGNETIC ATTACHMENT AND AUTOMATIC SAFETY LATCHING

(75) Inventor: Michael F. Bouissiere, Yorba Linda, CA (US)

(73) Assignee: Premier Mounts, Anaheim, CA (US)

( * ) Notice: Subject to any disclaimer, the term of this patent is extended or adjusted under 35 U.S.C. 154(b) by 314 days.

(21) Appl. No.: 11/854,848

(22) Filed: Sep. 13, 2007

(65) Prior Publication Data

US 2008/0061200 A1    Mar. 13, 2008

Related U.S. Application Data

(60) Provisional application No. 60/844,138, filed on Sep. 13, 2006.

(51) Int. Cl.
*A47G 1/17* (2006.01)

(52) U.S. Cl. .............. 248/206.5; 248/317; 248/309.4; 248/343; 248/323; 248/222.52; 362/398; 362/396; 362/389; 362/404; 362/406

(58) Field of Classification Search .......... 248/317, 248/323, 343, 683, 206.5, 220.21, 220.22, 248/221.11, 222.11, 222.51, 222.52, 309.4; 362/398, 396, 389, 404, 406; 464/29; 310/90.5; 403/DIG. 1
See application file for complete search history.

(56) References Cited

U.S. PATENT DOCUMENTS

| | | | | | |
|---|---|---|---|---|---|
| 1,561,554 | A | * | 11/1925 | Little | 362/398 |
| 3,593,021 | A | * | 7/1971 | Auerbach | 362/434 |
| 3,836,766 | A | * | 9/1974 | Auerbach | 362/311.14 |
| 4,391,543 | A | * | 7/1983 | Elsing | 403/24 |
| 4,489,366 | A | * | 12/1984 | Rozniecki | 362/270 |
| 4,649,445 | A | * | 3/1987 | Sheriff | 360/99.04 |
| 5,008,984 | A | * | 4/1991 | Levy | 24/303 |
| 5,317,789 | A | * | 6/1994 | Levy | 24/303 |
| 5,415,489 | A | * | 5/1995 | Hutchins et al. | 403/76 |
| 5,804,507 | A | * | 9/1998 | Perlov et al. | 438/692 |
| 6,042,068 | A | * | 3/2000 | Tcherny | 248/221.11 |
| 6,582,106 | B2 | * | 6/2003 | Jamison | 362/396 |
| 6,644,617 | B2 | * | 11/2003 | Pitlor | 248/544 |
| 6,708,940 | B2 | * | 3/2004 | Ligertwood | 248/324 |
| 6,988,698 | B2 | * | 1/2006 | O'Neill | 248/323 |
| 7,028,963 | B1 | * | 4/2006 | Silva et al. | 248/342 |
| 7,190,586 | B2 | * | 3/2007 | Franz et al. | 361/704 |
| 7,287,738 | B2 | * | 10/2007 | Pitlor | 248/544 |
| 7,445,346 | B2 | * | 11/2008 | Rizzo | 353/119 |
| 7,455,273 | B2 | * | 11/2008 | Lonnqvist | 248/343 |
| 7,503,536 | B2 | * | 3/2009 | Friederich et al. | 248/324 |
| 2005/0135874 | A1 | * | 6/2005 | Baylis et al. | 403/76 |
| 2005/0139742 | A1 | * | 6/2005 | Frisell | 248/317 |
| 2005/0167547 | A1 | * | 8/2005 | McLellan | 248/74.4 |
| 2006/0086873 | A1 | * | 4/2006 | Chen | 248/206.5 |
| 2007/0034765 | A1 | * | 2/2007 | Lo | 248/343 |
| 2008/0120865 | A1 | * | 5/2008 | Smith | 34/239 |
| 2008/0179475 | A1 | * | 7/2008 | Whitley et al. | 248/218.4 |

* cited by examiner

*Primary Examiner*—J. Allen Shriver, II
*Assistant Examiner*—Michael McDuffie
(74) *Attorney, Agent, or Firm*—Altera Law Group, LLC

(57) ABSTRACT

A system and method of releasably mounting a device, usually to a ceiling, is disclosed. The system has a ceiling mounted unit (200) and a device mounted unit (250), releasably joined preferably by an magnetic coupling (202) which engages a floating plate (252) allowing for positive coupling even if the units are misaligned. A safety latch (256) with a locking/latching claw (260) and ejection/disengagement prong (266) provide positive locking and a method of separating the units despite strong adhesion forces.

14 Claims, 9 Drawing Sheets

MOUNT WITH MAGNETIC ATTACHMENT AND AUTOMATIC SAFETY LATCHING

CROSS-REFERENCE TO RELATED APPLICATION

The present application claims the benefit of U.S. Provisional Application Ser. No. 60/844,138 filed on 13 Sep. 2006, the complete subject matter of which is hereby incorporated herein by reference in its entirety.

FIELD OF THE INVENTION

The present invention is directed generally to supporting structures for mounting devices, such as video projectors to a ceiling or other surface.

BACKGROUND

Video projectors and other ceiling mounted devices have been available for many years and are an integral part of both business and educational presentations. Early versions of these projectors were typically rested on a conference table or any convenient available surface and manually aimed at the intended viewing surface or screen. This placement had inherent drawbacks in that passers-by may block the projected image or inadvertently bump the table and knock the projector out of alignment, or even worse, liquid spillages on the conference table may damage the projector. Attempts to alleviate these problems have focused on mounting the projector on the ceiling or the wall.

One early mounting technique utilized a metal water pipe with a flange screwed onto each end. One flange was used to affix the mounting structure to the ceiling, while the other flange was attached to the projector. In the wake of solving some of the aforementioned problems, this mounting method unfortunately created a number of new problems. Foremost is the problem of assembly and installation. Because each installation may be different, the installers have to use pipe cutting and threading machines, which is time consuming, labor intensive and costly. There is also the question of safety with this method due to the cutting of threads into the piping and its subsequent weakening.

Probably the most widely used method of mounting a projector to the ceiling has been by the use of a single piece permanent mounting bracket. This device attaches to the projector on one side, and to the ceiling on the other. Although this requires minimal space, there exists the problem when the user wants to remove the projector for service or when it is in the way. This may require the use of a number of tools and may become very tedious when the working space is quite small.

Given the above, there is a need for a ceiling or wall mount device for a video projector which allows for both easy installation/mounting of the projector as well as an easy quick disconnect for ease of maintenance.

SUMMARY OF THE INVENTION

Generally, the present invention relates to a system and method for removably mounting a device to a surface including a release mechanism which is preferably magnetic.

In another embodiment there is disclosed an apparatus for removably mounting a device to a surface, having a first unit configured to be attached to a surface; a second unit configured to be attached to a device; one of said units including a contact plate, the other of said units including at least one magnet, said first and second units being configured to permit engagement of said magnet with said plate when said units are brought together; one of said units including a safety locking device having pivoting arm with an engagement claw; the other of said units having claw engaging portion shaped to engage said claw, and thereby locking the units together.

In another embodiment, the plate is floatably attached to one of said units.

In another embodiment, the plate is configured to articulate with three degrees of moment relative to said unit.

In another embodiment, the unit includes an interior base portion which further includes a rod extending from said base portion and being attached to said plate; said rod being free to float relative to said base portion, so that said plate floats with said rod.

In another embodiment, the base includes an aperture for receiving said rod, said aperture being larger than said rod so that said plate rod may float relative to said unit.

In another embodiment, the safety locking device further includes at least one disengagement prong pivotally moveable with said pivoting arm.

In another embodiment, the disengagement prongs extend away from said pivoting arm and when pivoted into engagement, with at least one magnet to urge the magnets apart when said pivot arm is operated to release the units from each other.

In another embodiment, there is an apparatus described for removably mounting a device to a ceiling surface, having: a first unit configured to be attached to the ceiling; a second unit configured to be attached to a device; one of said units including first adhesion element, the other of said units having a second adhesion element capable of releasably mating with said first element, said first and second units being configured to permit engagement when brought together; one of said units including an ejection element having pivoting arm with disengagement prongs extending away from said pivoting arm and when pivoted, urging the units to separate and disengage said adhesion elements.

In another embodiment, the adhesion elements are mechanically engaging devices.

In another embodiment, the adhesion elements employ chemical bonds.

In another embodiment, the adhesion elements include hook and loop fasteners.

In another embodiment, the pivoting arm further includes an engagement claw in one of said units and is configured to be received in the other of said units when said units are brought together.

In another embodiment, the pivot arm includes an aperture therethrough and further including a locking fastener sized to be received within said aperture and to engage the other of said units, so that when said fastener is inserted, the pivot arm is prevented from further pivoting.

In another embodiment, a method of securely docking a magnetic coupling to a receiving plate is described having the steps of: affixing a magnet element to one unit; affixing a plate element to another unit; configuring at one of the plates or magnet elements to be movable relative to the unit to which it is affixed, so that said movable element may move relative to said other element to accommodate angular misalignment between said elements when they approach each other.

In another embodiment, the method including the step of allowing angular movement of said plate relative to the unit to which it is affixed, providing a safely releasable securing device to a fixed mount, the device being mounted on a first unit with a second unit being fixedly mounted, one of the units having a magnet and the other unit having a ferro magnetic material, In another embodiment, a method for attaching a video projector to a ceiling is described comprising the steps of: adhering ceiling attachment hardware to the ceiling; attaching mounting hardware to the video projector; and securing the ceiling attachment hardware to the video projector's mounting hardware via a mating magnetic force.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
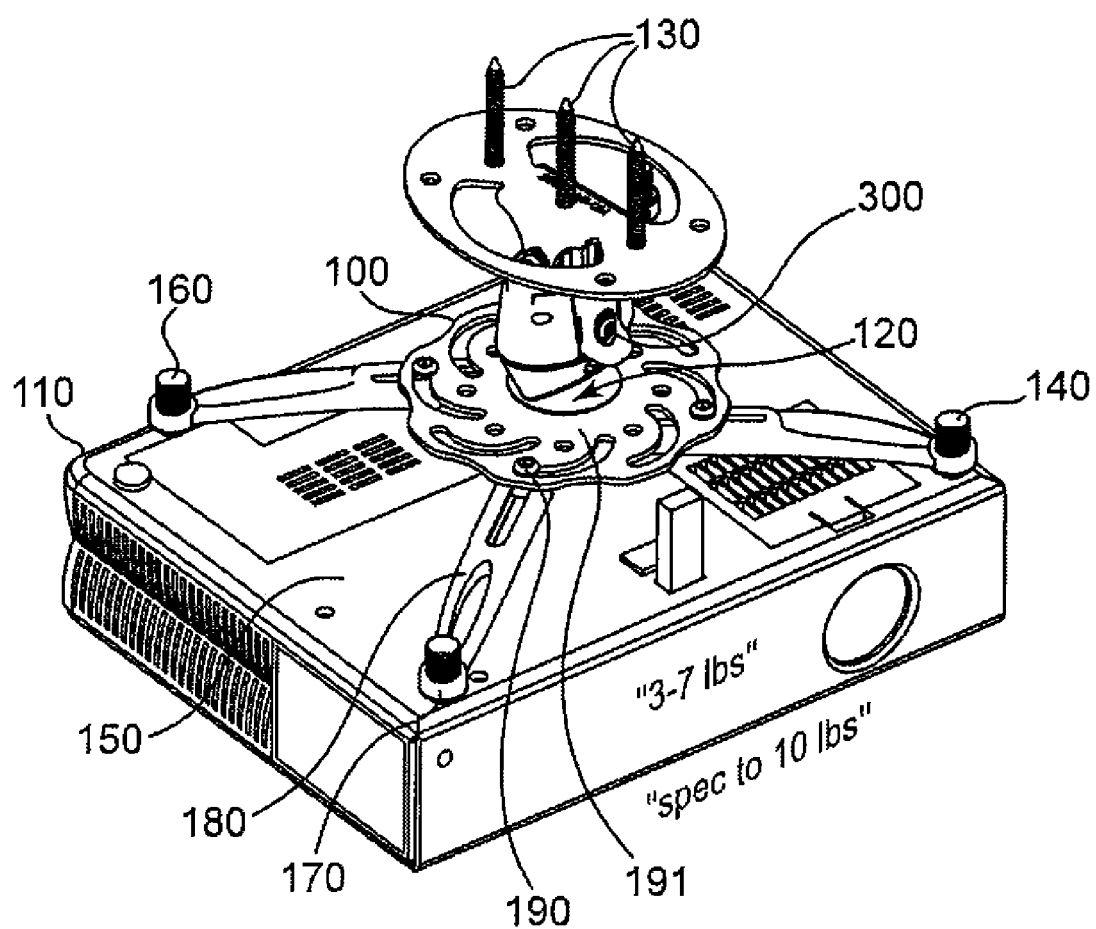
FIG. 1 is a perspective view of one embodiment of the mount with projector attached.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to over all modifications, equivalents, and alternatives falling within the spirit and scope of the invention as defined by the appended claims.

DETAILED DESCRIPTION

In general, the present invention is directed to supporting structures for video projectors and more particularly to an apparatus for mounting such a device to a ceiling. The preferred embodiments of the invention provide a convenient method for both attaching and disengaging a video projector to and from its ceiling attached mount without the use of cumbersome tools such as screwdrivers, wrenches, and the like which can be awkward when used overhead. The invention also describes a convenient method for adjusting the projected video image to a desired screen location after the projector has been securely mounted to the ceiling, wherein the installer does not have to support the weight of the projector overhead while simultaneously attempting to mount and align the projector.

Figure 1A:
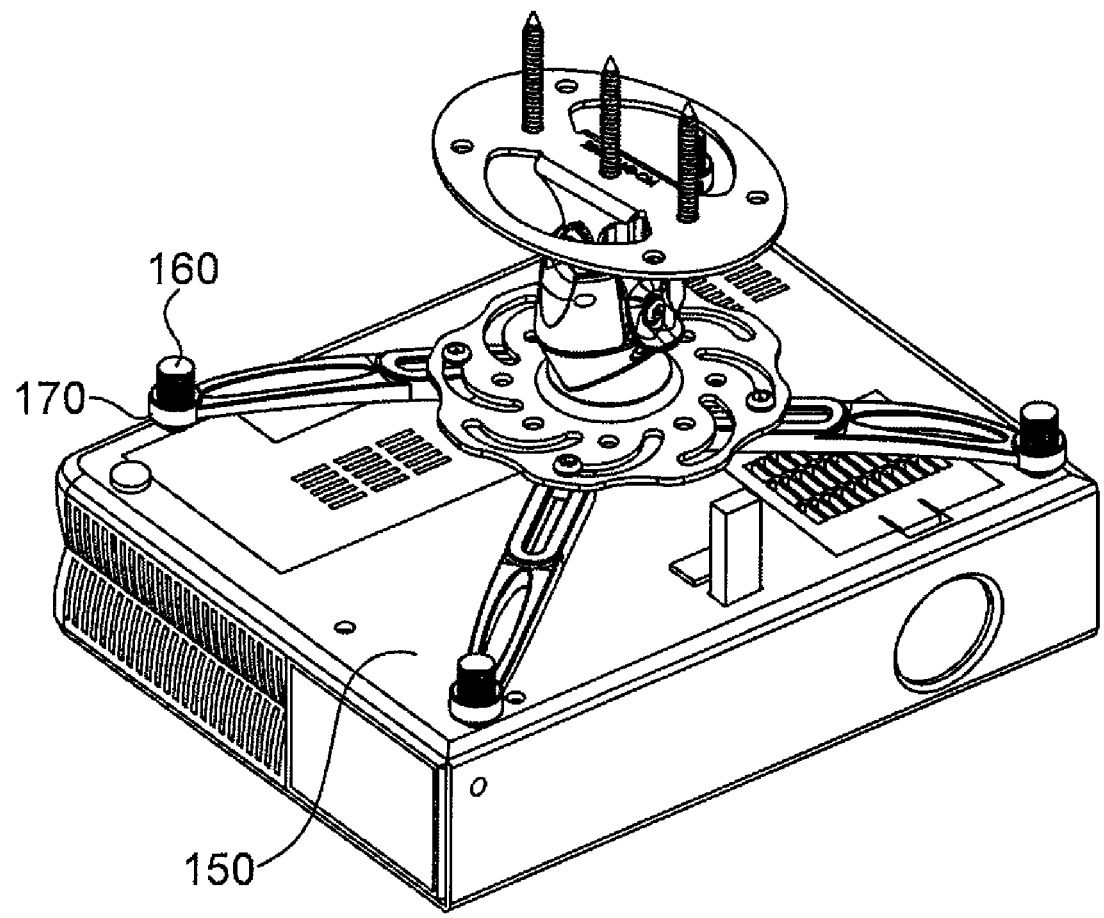
FIG. 1a is perspective view like FIG. 1 taken from another angle.
Figure 1B:
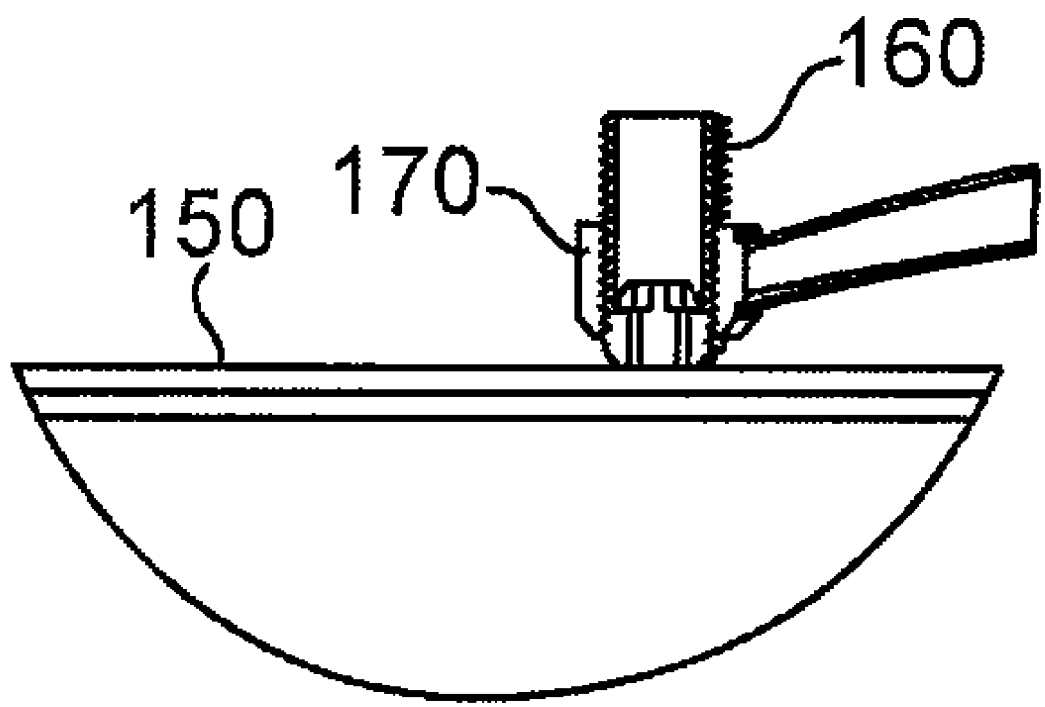
FIG. 1b is a side plan view of on attachment point.
Figure 1C:
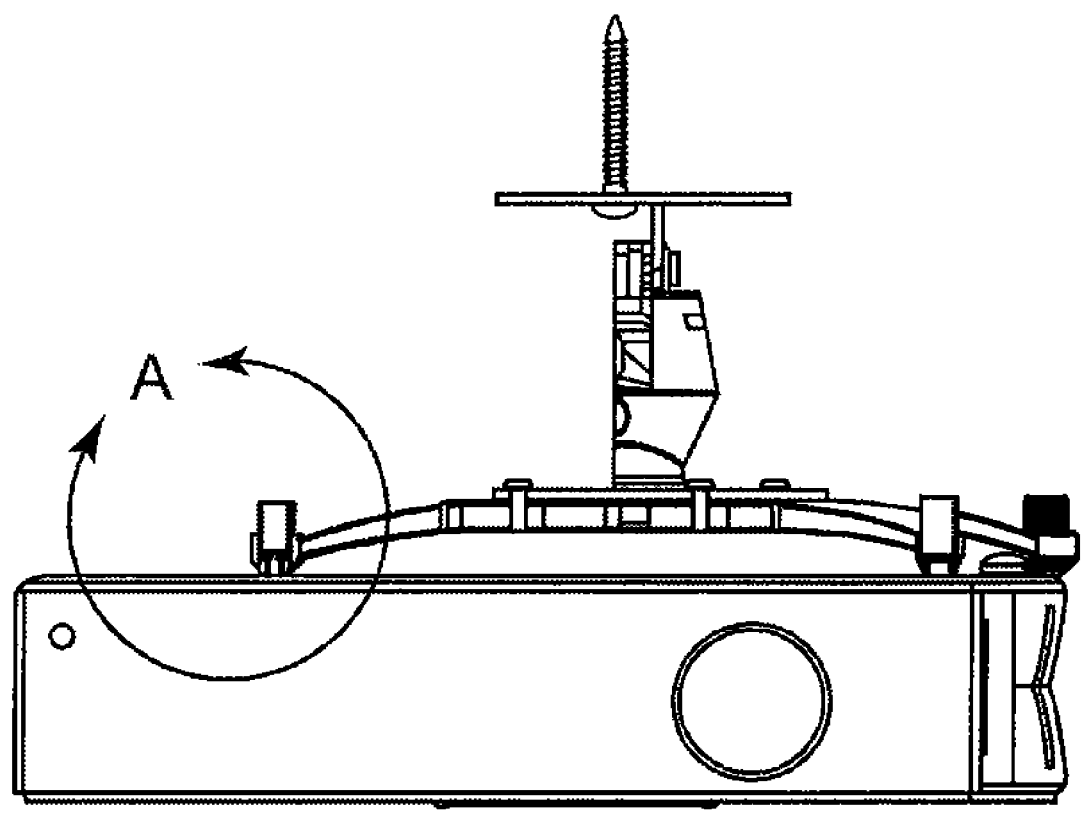
FIG. 1c is a side plan view of the environment of FIG. 1b.

FIG. 1 shows one embodiment of a mounting device 100 mechanically attached to a video projector 110 on its bottom surface via screw 120 (not shown in FIG. 1), and which may in turn be secured to an overhead ceiling via screws 130. To accommodate for irregularities in the mounting surface 150 of the video projector (e.g., non flat, slightly tilted, warped, etc.) threaded barrels 160 may independently be inserted/threaded through their respective sleeves 170 to level or otherwise stabilize the projector (see FIG. 1A for expanded view of the threaded barrels 160 in sleeve 170). The location at which each threaded barrel 160 contacts the top surface 150 of the projector may be altered by adjusting slotted leg 180 both radially and angularly until the desired contact location is reached and then affixed by tightening retaining screw 190 into gimball plate 191. The mounting device 100 shown in FIG. 1 allows for close mounting of the video projector 110 to a ceiling, however, other embodiments to be shown later allow for greater spacing from the ceiling to the video projector.

Figure 2:
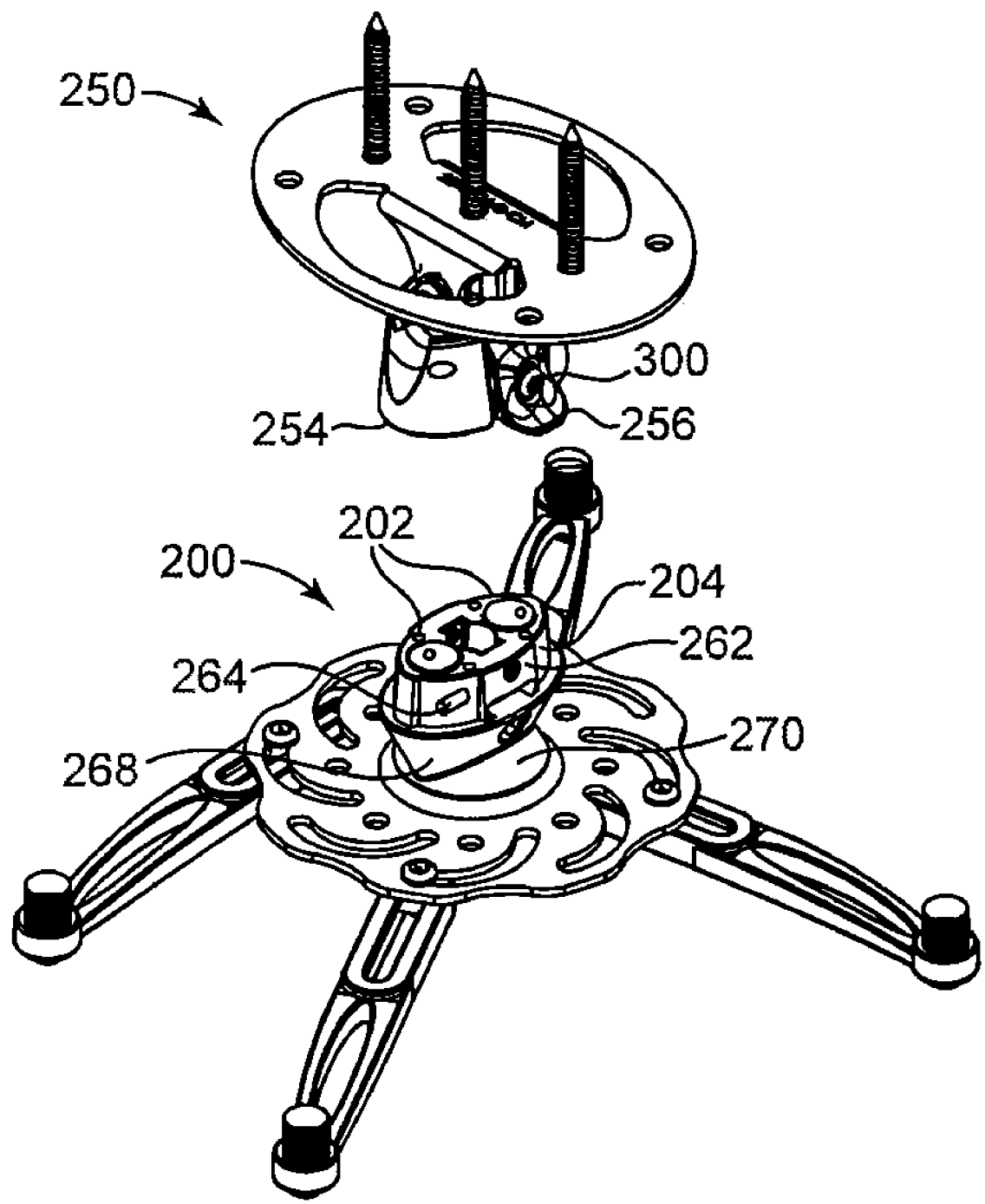
FIG. 2 is a perspective view of a portion of the mount.
Figure 2A:
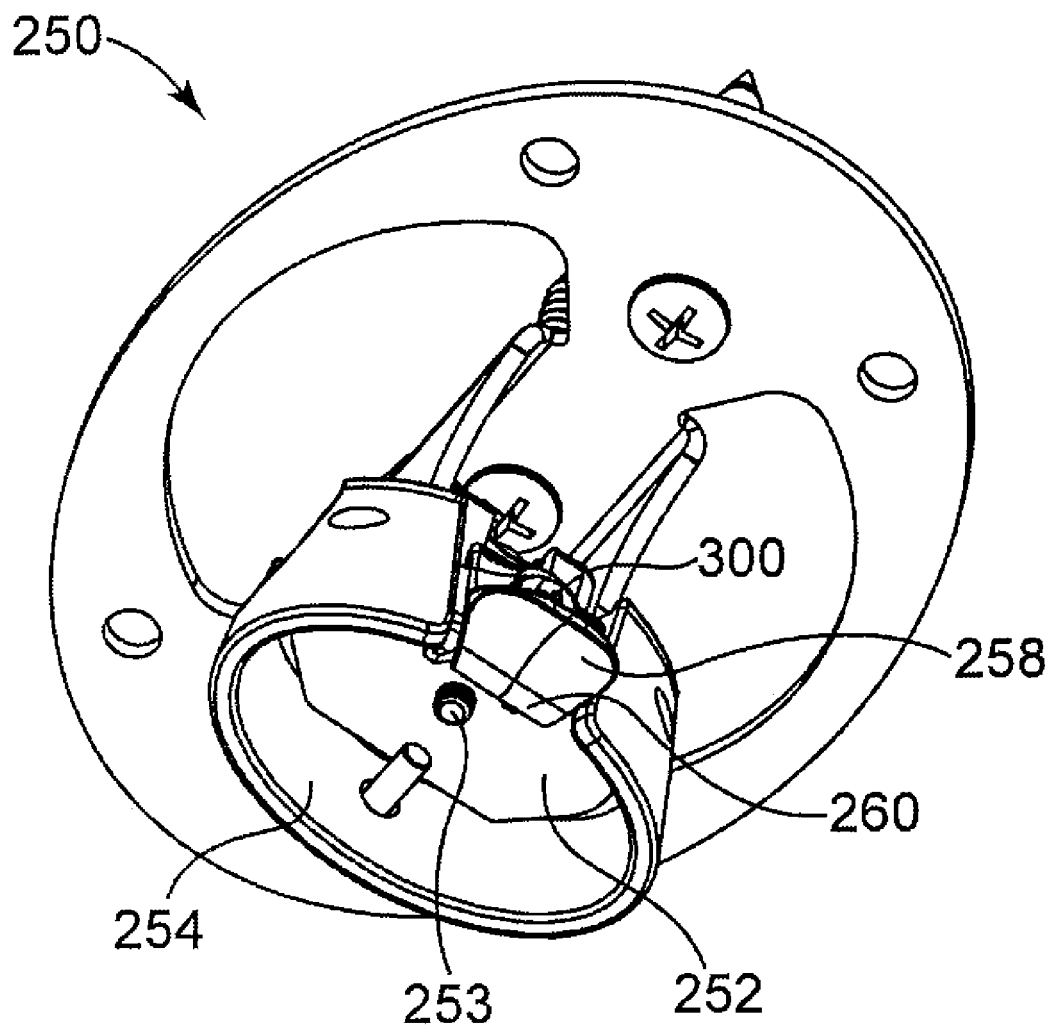
FIG. 2a is a perspective view of the portion of the mount typically attached to a ceiling.
Figure 2B:
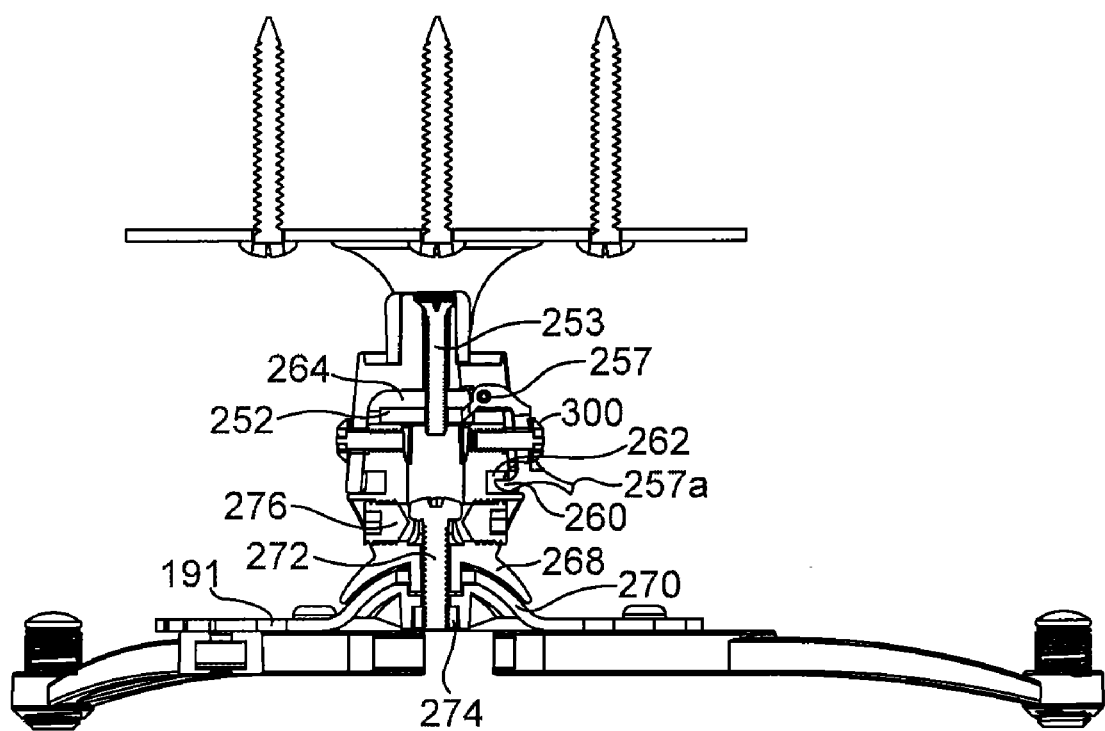
FIG. 2b is a side plan view, with portions broken away, of a mount.
Figure 2C:
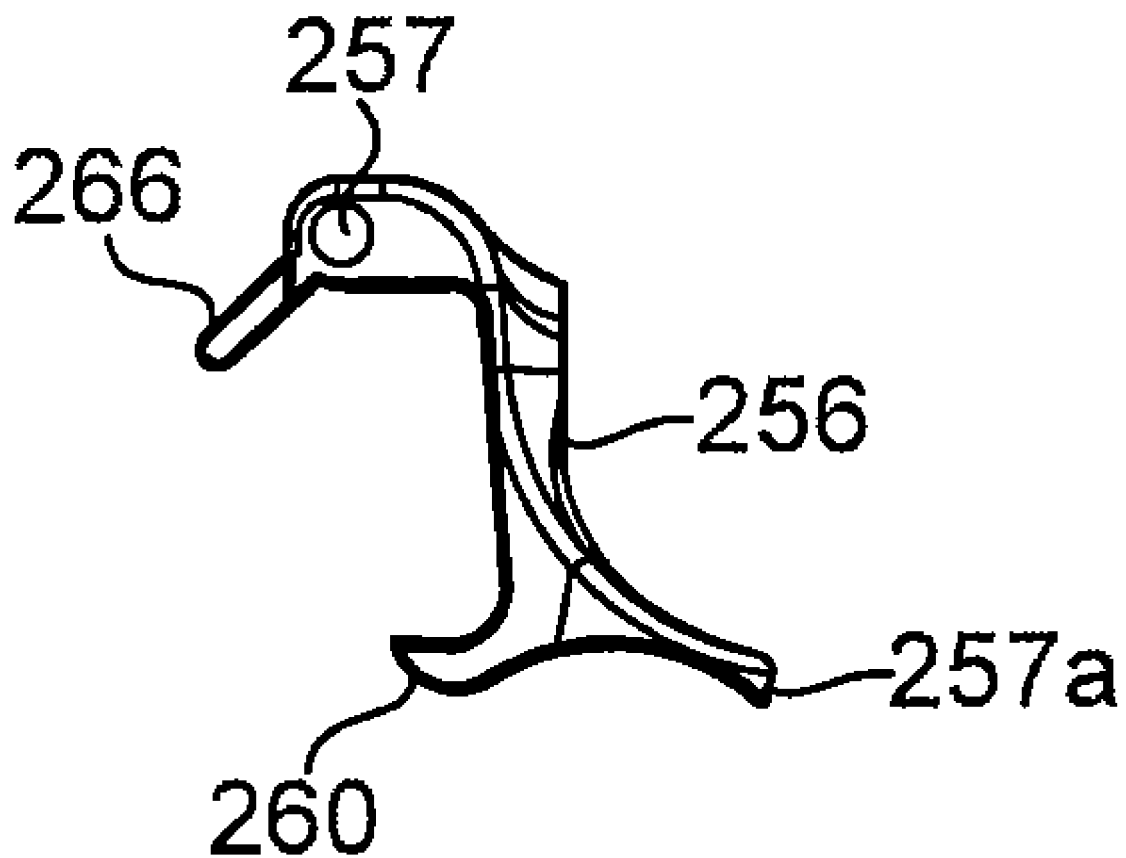
FIG. 2c is a close up plan view of a release portion shown in FIG. 2b.

FIG. 2 is an expanded view of the mounting device 100 depicted in FIG. 1, highlighting the separation of the mounting device 100 into its two main sub-assemblies, the projector attachment unit 200 and the ceiling attachment unit 250. One particular embodiment of the present invention allows for the ease of mating and dismounting the two main sub-assemblies as described below. The projector attachment unit 200 may have a pair of high energy magnets 202 mounted in housing unit 204, likewise, the ceiling attachment unit 250 may have an appropriate metal insert 252 (shown in FIG. 2A) mounted in housing unit 254. It is understood that other adhesion element/means are possible besides magnets (permanent or electro), such a high strength hook and loop systems (Velcro®), releasable adhesives (chemical bonding), vacuum, mechanical engagements, such as snap fit structures which require a release force greater than the weight of the object supported, etc. All of these alternates will just be referred to as "magnets" or "adhesion elements", for convenience.

The housing unit 204 is shown as elliptical, with the magnets 202 being mounted in spaced apart pairs, preferably with a magnet circuit completing plate joining the back side of the magnets. The magnet individually are "potted" with adhesive into the unit 204. Alternatively, the magnets can be tapered toward their exposed ends with the apertures in the unit being likewise tapered (with narrow ends exposed) so that the unit prevents slippage of the magnets out of the unit. Other means, such as a thin cover plate over the exposed ends of the magnets which is attached (by adhesive, fasteners, etc) to the unit. The cover plate can be a non-magnetizable material in which case it does not need apertures, or otherwise, the apertures must be smaller than the magnet body diameter so that the magnets cannot be withdrawn from their open end.

When housing unit 204 is inserted into housing 254, high energy magnets 202 attract and mate with metal insert/plate 252, which is a material capable of being attracted by the magnet (referred to as magnetically responsive material) with a sufficient binding force to support the video projector unit 110 with its' attached mounting hardware. In one embodiment of the present invention, the metal insert 252 is secured to housing unit 254 by screw 253 which may be threaded through the central region of metal insert 252. Screw 253 may have sufficient spacers to allow the inboard surface of metal insert 252 to stand-off from housing unit 254 and "float" on screw or rod 253 with respect to interior base wall of unit 250 (or 200 if reversed) upon which plate 252 abuts. Rod 253 passes through an aperture in the base which is sized to allow the rod to slide therein (i.e. aperture larger than the rod diameter) to allow floating. The rod is prevented from being withdrawn from the unit by an enlarged end (not shown) such as a fastener end.

With this construction, the rod is affixed to the plate in a floating relationship relative to the unit to which it is attached, providing the plate with at least 3 degrees of movement (in-out, rotational, angular deflection/tipping, or x-y, z axes, caused by the oversize aperture mentioned above).

By providing an adjustable gap, the plate is free to deflect in any angle to more easily mate with the magnets. So that if the magnets are not fully aligned with the plate at the point of contact, the plate will float to accommodate angular error and "snap" into engagement. In this configuration, the metal insert 252 may pivot about screw 253 to mate flush with the surface of the high energy magnets 202, and thereby achieve the maximum available magnetic mating force. Thus the insert is free to move about a pivot point (the screw in this case) in any angular direction including in/out, to accommodate any inexact mating of the magnet 202 or other engagement means as mentioned above. Once the high energy magnets 202 attract and mate with metal insert 252, mechanical locking device 256 may be engaged to ensure that any inadvertent additional weight applied to the projector attachment unit 200 does not result in disengaging the magnets 202 from the metal insert 252. The mechanical locking device 256 may be part of the ceiling attachment unit 250 with an adjustable lever arm 258 securely anchored thereto. In one embodiment, the adjustable lever arm 258 may have an extended lip 260 which may be inserted into recessed slot 262 in the projector attachment unit 200. When fully engaged, the adjustable lever arm 258 may be flush with the surface of the ceiling attachment unit 250 and the extended lip 260 fully inserted into recessed slot 262, in this configuration if for some reason the high energy magnets 202 fail or mechanically disengage or eject from the metal insert 252, the extended lip 260 is designed to bear the entire weight of video projector unit 110 with its' attached mounting hardware. In order to increase the binding force between the high energy magnets 202 and metal insert 252, a magnetic booster element may be inserted behind, and in close proximity, to the high energy magnets 202. In one embodiment, the magnetic strength enhancer or booster element may be a steel rod or sheet or plate of ferro magnet material (materials which are attracted by magnets) located at the distal end of the magnets (underneath) 202, either in contact therewith or spaced therefrom. This booster increases and concentrates the magnetic flux lines which emanate from the proximal ends of the magnets (i.e. the ends which engage plate 252) by connecting the magnets at proximate their distal ends The magnets are maintained, preferably by glue in their housing 204 which is preferably a keyed shape, not round, in this case oval, to insure instant alignment with the receiver portion in unit 250 which is like shaped. In this configuration this housing 204 is tapered in a distal direction to enhance its ease of reception into housing 254. Another solution to maintaining the magnets 202 in their housing is to provide a lip thereon at the proximal end (the end not visible) so that they cannot be remove by any amount of force. The lip could be circumferential portion which has a larger diameter than the aperture in which the rest of the magnet body resides in the housing. Another solution is to provide magnets which are at least slightly conical (tapered, from back to front—the front being the exposed end). With a like taper in the receiving aperture in the housing, the magnets cannot be withdrawn from the exposed side (i.e. in the direction of insertion), due to the taper.

For ease in disengaging the high energy magnets 202 from the metal insert 252 (when it may be desired to remove the video projector 150 from the ceiling but leave the ceiling attachment unit 250 in place) means are provided with using leverage to separate the magnets from the floating plate 252. This lever means can take the form of a mechanical locking device 256 with disengaging prong(s) 266 incorporated therein. The prong or prongs 266 reside in a recess provided when not used for disengaging. (Non-magnet adhesion, as indicated previously, such leverage action is likewise useful to disengage the locking means). When the mechanical locking device 256 is caused to rotate away from being flush with the surface of the ceiling attachment unit 250, the disengaging prongs 266 rotate inward and apply a force to partially, but not fully, disengage the high energy magnets 202 from the metal insert 252.

Figure 2D:
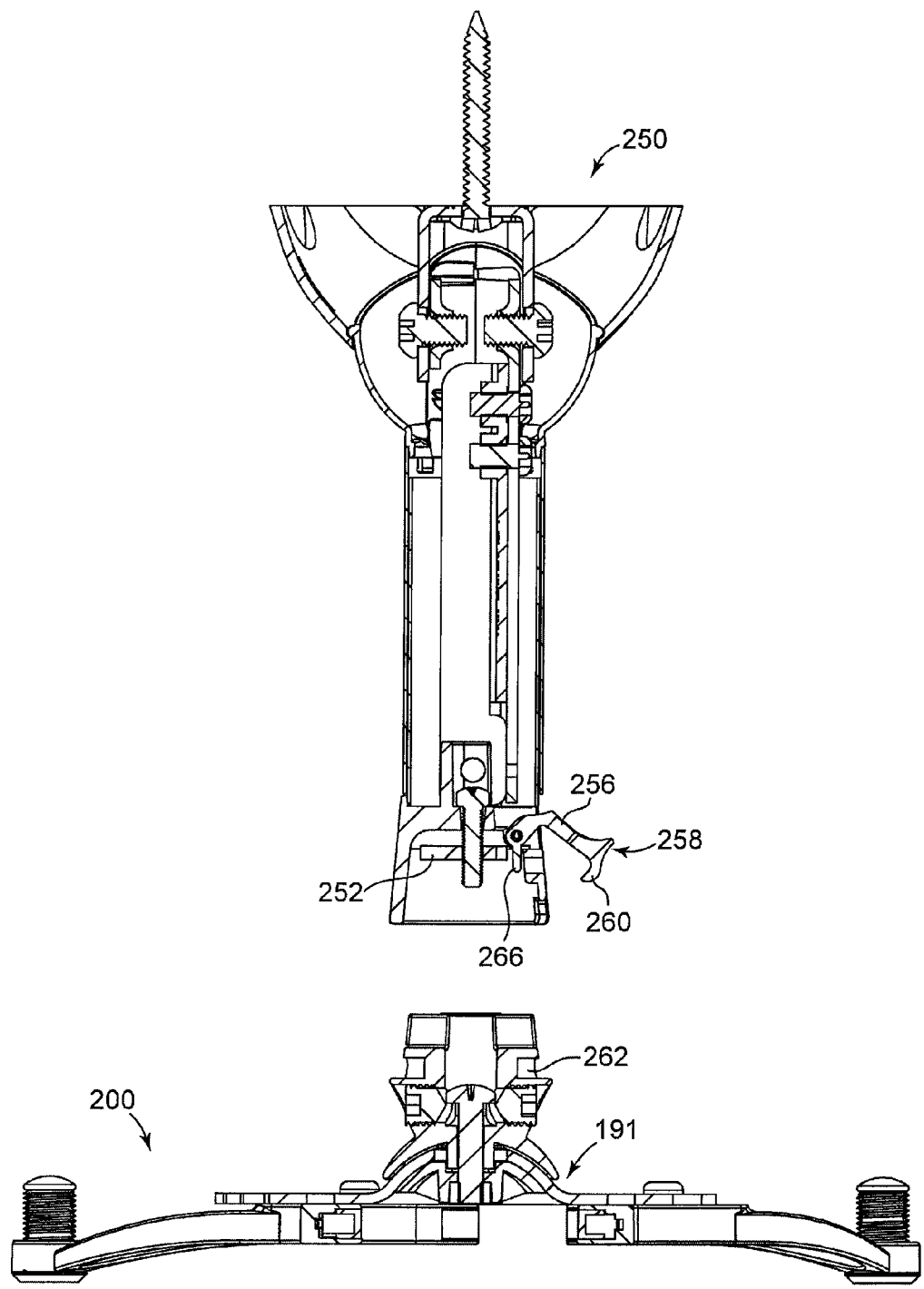
FIG. 2d is a view like FIG. 2b but with an extension arm and with the ceiling and device mount units separated.

FIGS. 2*a-d* illustrate embodiments with close up views of the leverage disengagement/ejection feature 256. As clearly visible in FIG. 2*c*, it includes a pivot point aperture 257 which rotates on a pivot which is attached to the main body of the ceiling portion (though it could also be the projector portion), an extension lip or locking/latching claw 260 engages a mating recess 262. FIG. 2*d* shows the units separated, unlike FIG. 2*b* which shows them joined. These figures differ primarily in their overall length, i.e. for installations which ceiling extension/off set is required. Disengagement is urged by disengaging prong(s) 266 which extend from pivot point 257 and are configured to engage some portion of the other section (i.e. other than the section to which the pivot is affixed) so ask to provide a separating force. In this embodiment, the prongs engage the floating plate 252, but this is not a critical location. They could engage any part of the other unit or the magnets to urge the units apart. Notice that the prong 266 is actuated by contact with the magnet from unit 200 and consequently claw 260 automatically (and essentially simultaneously) engages notch 262 when units 200 and 250 are brought firmly together. The claw and prongs are rigidly connected together on said latch and configured to alternately disengage and latch said units together depending on the position of the latch, i.e. at one extreme, the prong ejecting the unit, and at the other, the claw captures the units together, and the latter is more or less automatic. This means that this safety feature can be made to be partially or fully engageable by the action of connecting the units thereby minimizing the chance that the safety latch will be forgotten. A further locking set screw can be provided to make the safety latch unremovable until the set screw is removed.

The pivot motion is initiated by the user by applying force against the finger extension 257*a* which causes rotation on the pivot 257 and separation forces to be applied through the prongs 266 while simultaneously causing lip 260 to be withdrawn from the recess 262. In the opposite direction, i.e. locking, the engagement of the magnet (or plate in a reverse configuration where the magnet and plate are swapped, not shown), with the prong 266 automatically causes lip 260 to engage notch 262, though additional locking force manually applied is always prudent.

In one embodiment, the disengaging prongs 266 when engaged may reduce the binding force between the high energy magnets 202 and the metal insert 252 by as much as 30%, however, in this configuration the high energy magnets 202 will still have sufficient binding force to support the projector 150 with its' mounting hardware attached. However, to ensure that the adjustable lever arm 258 is not unintentionally (or mistakenly) rotated away from the surface of the projector attachment unit 200, thereby partially disengaging the high energy magnets 202 and the metal insert 252, means are provide as a secondary lock. In this embodiment a retaining screw (locking fastener) 300 (see FIGS. 1 and 2) may be inserted through the mechanical locking device 256 thereby anchoring the lever arm 258 to housing unit 204. Other means of double-latching the arm may be provided as known in the art or may be later developed. For example, the arm may have protrusions on its side which engage recesses in the adjacent body to force a slight expansion of the body when forced into or out of locked position. A safety latch over the arm may also be provided.

With the video projector 150 securely mounted to the ceiling via the ceiling attachment unit 250, the projected image may be aligned in the following manner. The bottom surface of housing unit 204 flares out to form a flange 268 which rests upon surface 270 of gimball plate 191, which has a sufficient radius to form an adjustable ball and socket type configuration. When initially installed the projector housing unit 200 may be attached to the gimball plate 191 via screw 272 partially threaded into nut 274, but not fully tightened. In this configuration, surface 270 (the "ball") may be manually adjusted inside flange 268 (the "socket") to adjust the projector 110 to the desired angle. Once the desired orientation of the projector 110 is achieved, set screws 276 may be tightened to apply sufficient vertical travel to screw 272 to mechanically secure the gimball plate 191 to flange 268, thereby securing the projector 110. In one embodiment of the present invention, surface 270 may be freely rotated within flange 268 by approximately 6° in any arbitrary angle relative to the vertical, however, other angles may be achieved by either modifying the ball and socket geometries shown in FIG. 2b or employing an alternative pivot arm.

As noted above, the present invention is applicable to any device which must be removably detached from a fixed mount and is believed to be particularly useful for ceiling mounting. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

I claim:

1. An apparatus for removably mounting a device to a surface, comprising;
    a. a first unit configured to be attached to a surface;
    b. a second unit configured to be attached to a device;
    c. one of said units including a magnet receiving contact plate, the other of said units including at least one magnet, said first and second units being configured to permit engagement of said magnet with said plate when said units are brought together;
    d. wherein said contact plate is floatably attached to one of said units by a pivot plate attached by a rod adjustably connected the plate and the one of said units.

2. The apparatus of claim 1 wherein said contact plate is configured to articulate with three degrees of moment relative to said unit.

3. The apparatus of claim 2 wherein said unit includes an interior base portion which further includes a rod attached to and extending from said base portion and also being attached to said contact plate; said rod being free to float relative to said base portion, so that said plate float with said rod.

4. The apparatus of claim 3 wherein said base includes an aperture for receiving said rod, said aperture being larger than said rod so that said contact plate may float relative to said unit.

5. The apparatus of claim 1 wherein said safety locking device further includes at least one disengagement prong pivotally moveable with said pivoting arm.

6. The apparatus of claim 5 wherein said disengagement prong extend away from said pivoting arm and when pivoted, into engagement with said at least one magnet to urge the magnets apart from said plate when said pivot arm is operated to release the units from each other.

7. The apparatus of claim 5 wherein said disengagement prong extend away from said pivoting arm and when pivoted, into engagement with the unit opposite the one to which it is attached so that when said pivot arm is operated it disengages the units from each other.

8. A system for safe removable mounting of at least one apparatus to a ceiling surface, comprising;
    a. a first unit configured to be attached to the ceiling;
    b. at least one second unit configured to be attached to a device;
    c. one of said units including first adhesion element, the other of said units having a second adhesion element capable of releasably mating with said first element, said first and second units being configured to permit engagement when brought together, one of said adhesion elements being configured to be capable of movement on three axes so as to more easily mate with said other adhesion element;
    d. one of said units including a pivoting safety latch with an ejection element having pivoting arm with a disengagement prongs, proximate one end of the latch, extending away from said pivoting arm and when pivoted, for urging the units to separate and disengage said adhesion elements; and a latch claw proximate an opposite end of the latch, said claw configured to engage a recess in the other of said units, so that the units are latched together when said claw is engaged.

9. The system of claim 8 wherein said adhesion elements are mechanically engaging devices.

10. The system of claim 8 wherein said claw and prongs are rigidly connected together on said latch and configured to alternately disengage and latch said units together depending on the position of the latch.

11. The system of claim 8 wherein said adhesion elements include hook and loop fasteners.

12. The system of claim 8 wherein said adhesion elements include magnets in one of said units and a magnetically responsive element on said other unit.

13. The system of claim 12 wherein said magnets are tapered along their length and wherein said unit includes a like tapered aperture to receive said magnets, said taper preventing removal of the magnets in the direction of insertion.

14. The system of claim 12 wherein said pivot arm includes an aperture therethrough and further including a locking fastener sized to be received within said aperture and to engage the other of said units, so that when said fastener is inserted, the pivot arm is prevented from further pivoting.

* * * * *